(12) United States Patent
Tseng

(10) Patent No.: US 7,929,289 B2
(45) Date of Patent: Apr. 19, 2011

(54) ELECTRONIC DEVICE AND ASSEMBLY STRUCTURE THEREOF

(75) Inventor: Chen Tseng, Kaohsiung (TW)

(73) Assignee: Quanta Computer Inc., Tao Yuan Shien (TW)

( * ) Notice: Subject to any disclaimer, the term of this patent is extended or adjusted under 35 U.S.C. 154(b) by 112 days.

(21) Appl. No.: 12/430,929

(22) Filed: Apr. 28, 2009

(65) Prior Publication Data

US 2010/0142141 A1 Jun. 10, 2010

(30) Foreign Application Priority Data

Dec. 4, 2008 (TW) .............................. 97221693 U

(51) Int. Cl.
*G06F 1/16* (2006.01)
(52) U.S. Cl. ................................................. 361/679.39
(58) Field of Classification Search ............. 361/679.02, 361/679.31, 679.33, 679.38, 679.39
See application file for complete search history.

(56) References Cited

U.S. PATENT DOCUMENTS

| | | | | |
|---|---|---|---|---|
| 5,692,208 A * | 11/1997 | Felcman et al. | ......... | 361/679.38 |
| 6,452,787 B1 * | 9/2002 | Lu et al. | ............... | 361/679.38 |
| 6,469,900 B2 * | 10/2002 | Cheng | ..................... | 361/726 |
| 6,643,139 B2 * | 11/2003 | Tien | ............................... | 361/727 |
| 6,724,616 B2 * | 4/2004 | Kuo et al. | ................ | 361/679.02 |
| 6,785,141 B2 * | 8/2004 | Fang | ............................. | 361/727 |
| 6,978,903 B2 * | 12/2005 | Son et al. | ......................... | 211/26 |
| 6,992,886 B2 * | 1/2006 | Salinas et al. | ............ | 361/679.38 |
| 7,009,837 B2 * | 3/2006 | Lo | ............................ | 361/679.55 |
| 7,046,505 B2 * | 5/2006 | Hsu | ......................... | 361/679.39 |
| 7,140,904 B2 * | 11/2006 | Carr et al. | ..................... | 439/372 |
| 7,265,987 B2 * | 9/2007 | Zhang et al. | .................. | 361/727 |
| 7,359,187 B2 * | 4/2008 | Hu et al. | .................. | 361/679.33 |
| 7,430,115 B2 * | 9/2008 | Liu et al. | .................. | 361/679.33 |
| 7,679,899 B2 * | 3/2010 | Hsieh et al. | ............. | 361/679.38 |
| 7,681,210 B2 * | 3/2010 | Jiang et al. | .................... | 720/638 |
| 7,793,312 B2 * | 9/2010 | Yang | ............................. | 720/610 |
| 2002/0071254 A1 * | 6/2002 | Tien | ............................. | 361/727 |

* cited by examiner

*Primary Examiner* — Lisa Lea-Edmonds
(74) *Attorney, Agent, or Firm* — Thomas|Kayden

(57) ABSTRACT

An assembly structure includes a first body, a second body and a third body. The second body detachably disposed on the first body includes a first positioning portion and a first acting portion. The third body coupled between the first and second bodies includes a second positioning portion and a second acting portion. When the third body is switched to a first predetermined position, the second positioning portion of the third body is pressed against the first positioning portion of the second body along a reference direction, thereby positioning the second body at a first reference position. When the third body is switched from the first predetermined position to a second predetermined position, the second acting portion of the second body is pressed against the first acting portion of the second body, thereby moving the second body from the first reference position to a second reference position.

18 Claims, 9 Drawing Sheets

ELECTRONIC DEVICE AND ASSEMBLY STRUCTURE THEREOF

CROSS REFERENCE TO RELATED APPLICATIONS

This Application claims priority of Taiwan Patent Application No. 097221693, filed on Dec. 4, 2008, the entirety of which is incorporated by reference herein.

BACKGROUND OF THE INVENTION

1. Field of the Invention

The present invention relates to an assembly structure, and in particular relates to an electronic device and an assembly structure thereof utilizing a switchable device to perform positioning or separation of a movable element.

2. Description of the Related Art

For optical disk drives (ODD) of laptops, releasing mechanisms such as ODD release devices are applied to release the optical disk drives by horizontal strokes. Generally, the ODD release device is composed of several components, spatially decreasing useable space of laptops.

BRIEF SUMMARY OF THE INVENTION

To increase the useable space of laptops, the invention thus provides a simplified assembly structure to rotatably position or release the ODD.

An assembly structure of the invention comprises a first body, a second body and a third body. The second body comprises a first positioning portion and a first acting portion. The second is detachably disposed on the first body in a manner such that the second body is movable between a first reference position and a second reference position. The third body comprises a second positioning portion and a second acting portion. The third body switched between a first predetermined position and a second predetermined position is coupled between the first body and the second body. When the third body is switched to the first predetermined position, the second positioning portion of the third body engaged with the first positioning portion of the second body is pressed against the first positioning portion of the second body along a reference direction, so that the second body is positioned at the first reference position. When the third body is switched from the first predetermined position to the second predetermined position, the second acting portion of the second body is pressed against the first acting portion of the second body along a predetermined direction different from the reference direction, so that the second body is moved from the first reference position to the second reference position.

Preferably, the first body comprises a first guiding portion and the third body further comprises a second guiding portion, and the second guiding portion of the third body is guided by the first guiding portion of the first body. The first guiding portion of the first body comprises two recesses and the second guiding portion of the third body comprises two guiding blocks fitted movably in the two recesses.

The second body further comprises an approximately C-shaped portion, and the first positioning portion and the first acting portion are two surfaces located at different places.

The third body further comprises a first end, and the second positioning portion is a recess formed at the first end. The third body further comprises a second end, and the second acting portion is a curved surface formed at the second end. The curved surface comprises at least two surfaces with different curvatures.

The assembly structure further comprises a flexible device disposed between the third body and the first body. When the third body is switched to the first predetermined position, the second positioning portion of the third body is engaged to the first positioning portion of the second body and pressed against the first positioning portion of the second body via the flexible device along the reference direction. The flexible device comprises a helix tension spring or a torsion spring.

The assembly structure further comprises a shaft. The third body is coupled to the first body via the shaft, the reference direction is a longitudinal direction of the shaft, and the predetermined direction is a rotating direction of the shaft.

Additionally, the invention further provides an electronic device. The electronic device comprises a host, a controlling unit, a movable element and a switchable device. The movable element comprises a first positioning portion and a first acting portion. The movable element is detachably disposed on the host in a manner such that the movable element is selectively coupled to the controlling unit and movable between a first reference position and a second reference position to. The switchable device, switched between a first predetermined position and a second predetermined position to couple between the host and the movable element, comprises a second positioning portion and a second acting portion. When the switchable device is switched to the first predetermined position, the second positioning portion of the switchable device engaged with the first positioning portion of the movable element is pressed against the first positioning portion of the movable element along a reference direction, so that the movable element is positioned at the first reference position and the movable element is coupled to the controlling unit. When the switchable device is switched from the first predetermined position to the second predetermined position, the second acting portion of the movable element is pressed against the first acting portion of the movable element along a predetermined direction different from the reference direction, so that the movable element is moved from the first reference position to the second reference position and the coupling of the movable element and the controlling unit is disconnected.

The host comprises a first guiding portion and the switchable device further comprises a second guiding portion, and the second guiding portion of the switchable device is guided by the first guiding portion of the host. The first guiding portion of the host comprises two recesses and the second guiding portion of the switchable device comprises two guiding blocks fitted movably in the two recesses of the first guiding portion.

The movable element further comprises an approximately C-shaped portion, and the first positioning portion and the first acting portion are two surfaces located at different places.

The switchable device further comprises a first end, and the second positioning portion is a recess formed at the first end. The switchable device further comprises a second end, and the second acting portion is a curved surface formed at the second end. The curved surface comprises at least two surfaces with different curvatures.

The electronic device further comprises a flexible device disposed between the switchable device and the host, wherein when the switchable device is switched to the first predetermined position, the second positioning portion of the switchable device is engaged to the first positioning portion of the movable element and pressed against the first positioning portion of the movable element via the flexible device along the reference direction. The flexible device comprises a helix tension spring or a torsion spring.

The electronic device further comprises a shaft. The switchable device is coupled to the host via the shaft, the reference direction is a longitudinal direction of the shaft, and the predetermined direction is a rotating direction of the shaft.

The movable element is an optical disk drive. The controlling unit is a circuit board.

The electronic device is a computer.

A detailed description is given in the following embodiments with reference to the accompanying drawings.

BRIEF DESCRIPTION OF THE DRAWINGS

The present invention is more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
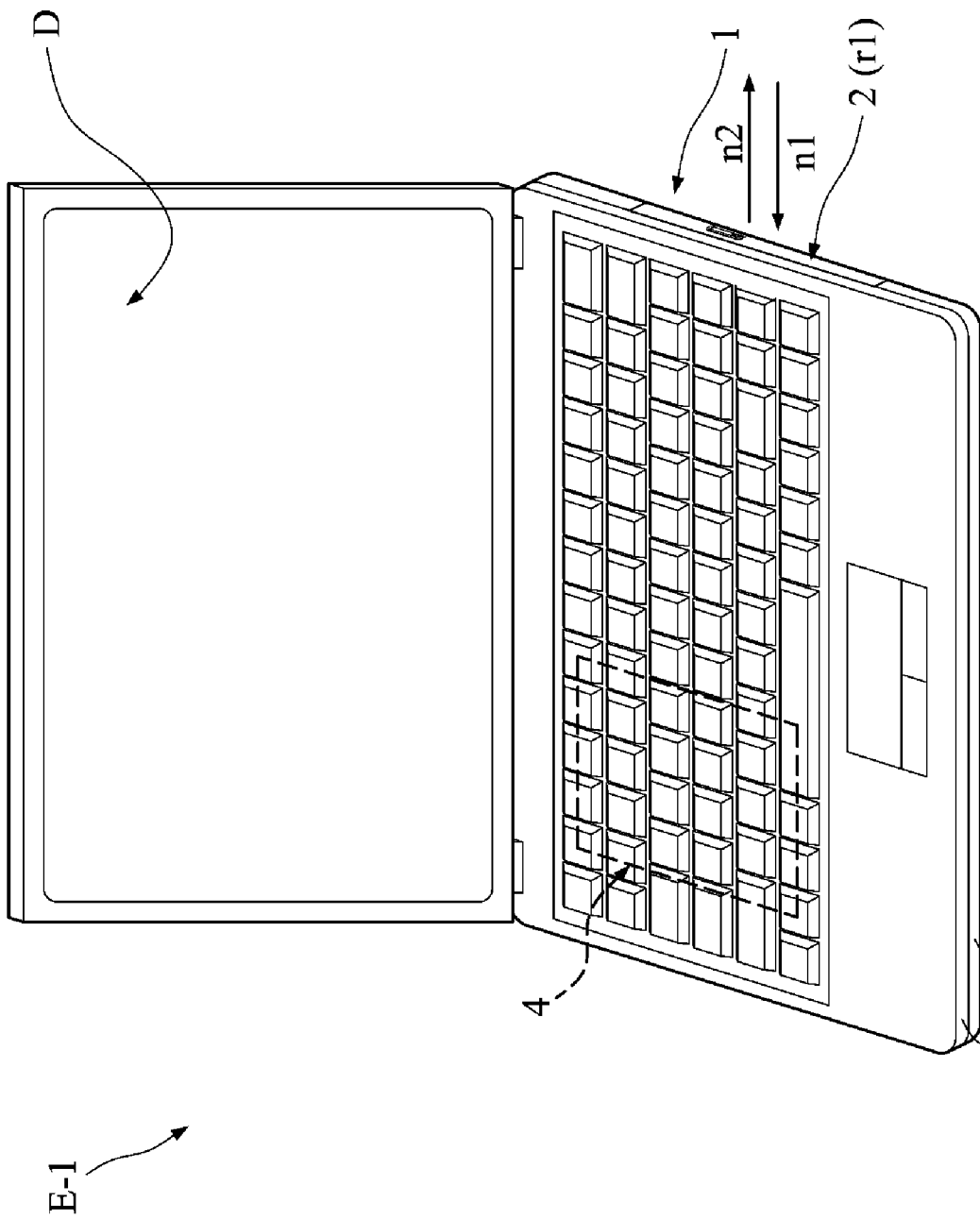
FIG. 1A is a schematic view of an electronic device of a first embodiment of the invention.
Figure 1B:
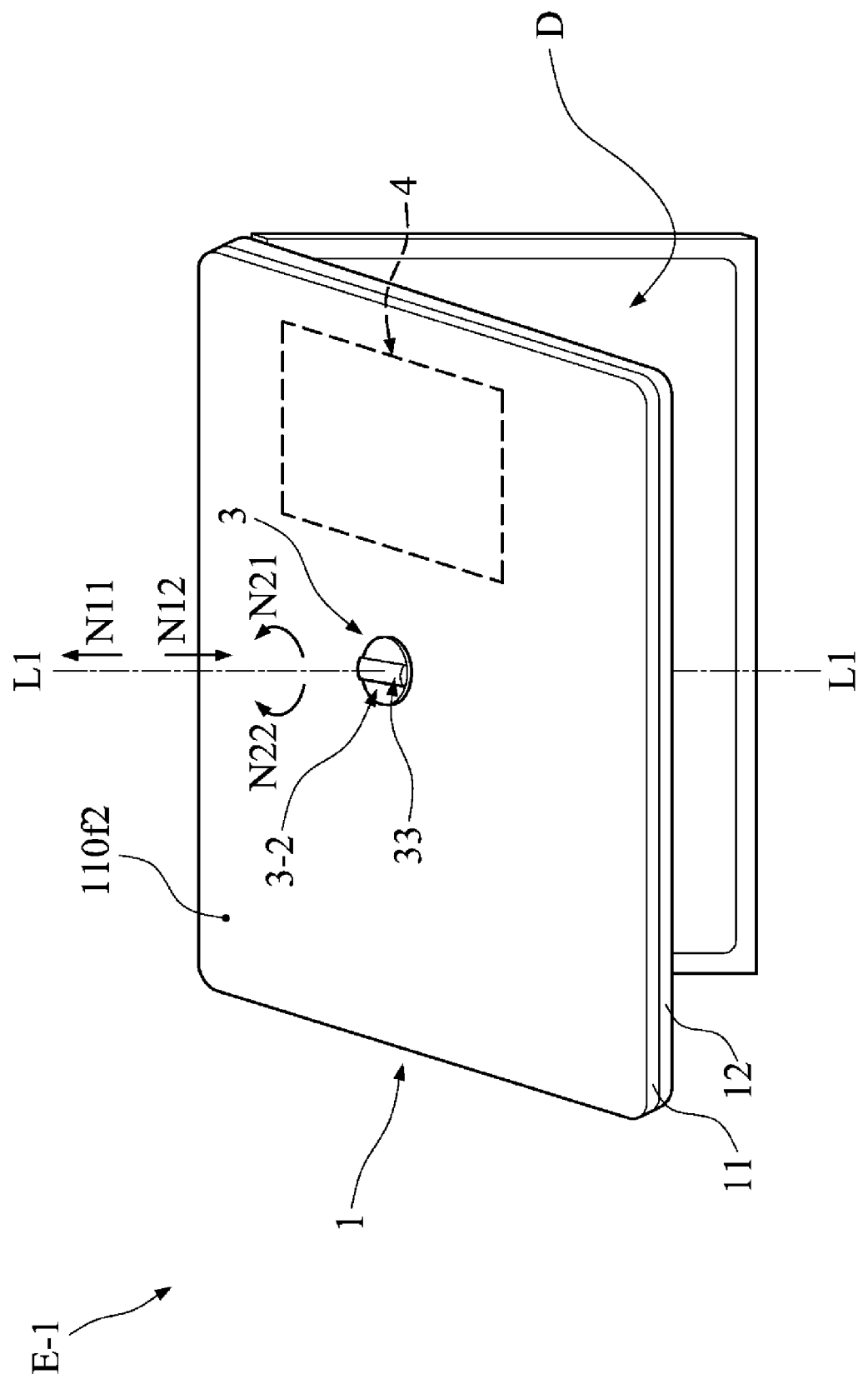
FIG. 1B is another schematic view of the electronic device in FIG. 1A.

FIG. 1A is a schematic view of an electronic device E-1 of a first embodiment, and FIG. 1B is another schematic view of the electronic device E-1 in FIG. 1A.

Figure 2A:
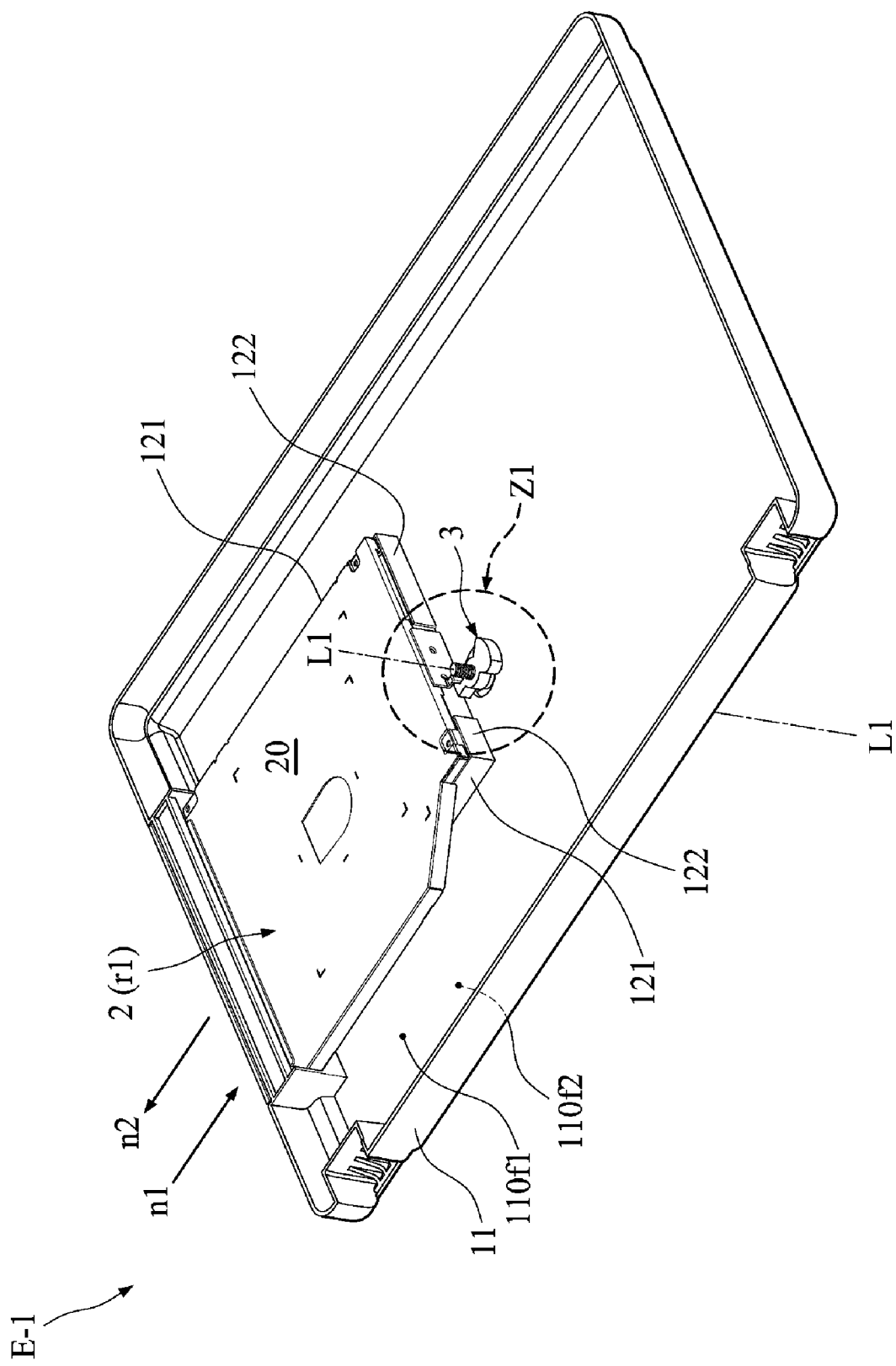
FIG. 2A is a schematic view of a partial structure of the electronic device in FIG. 1B.
Figure 2B:
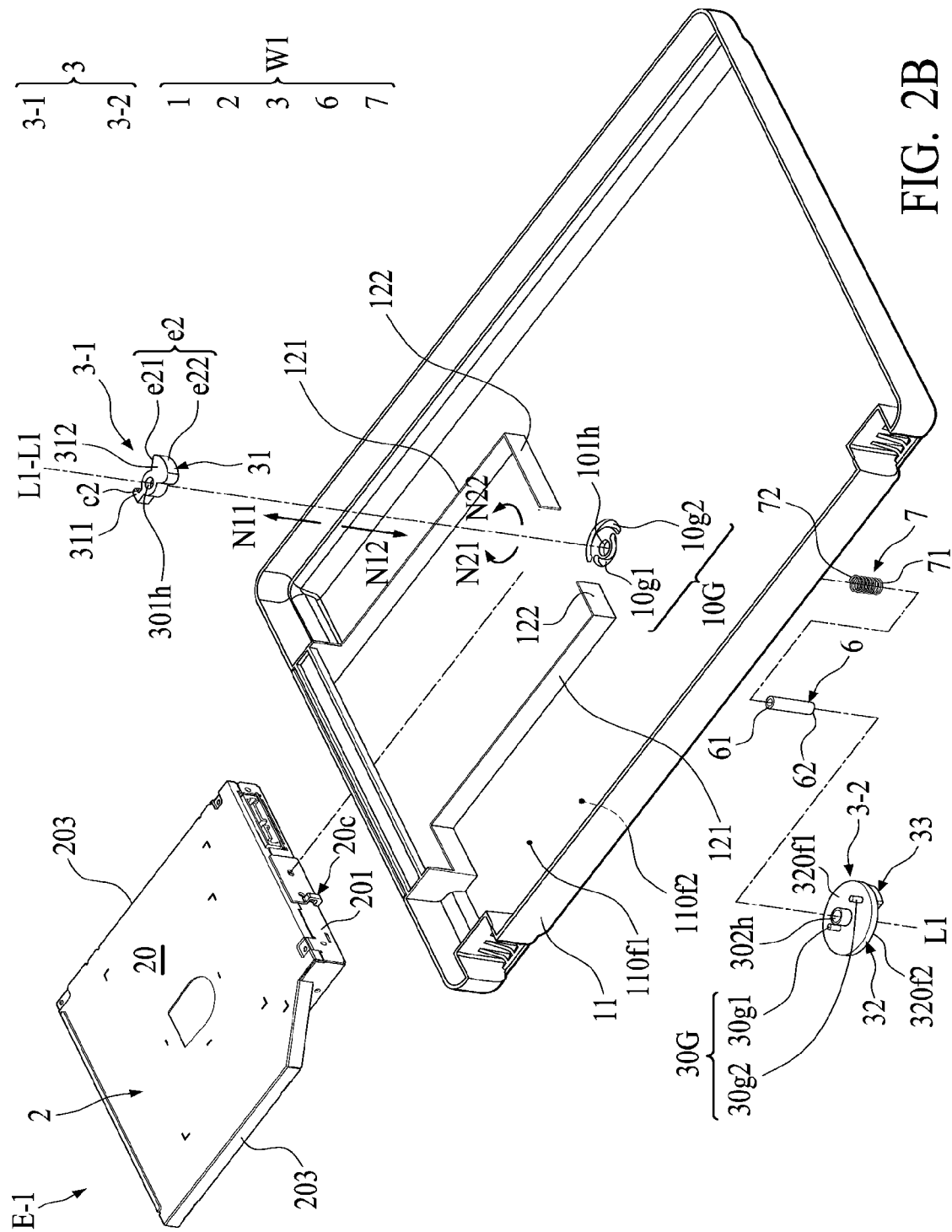
FIG. 2B is a partially exploded view of the electronic device in FIG. 2A.

In FIGS. 1A and 1B, the electronic device E-1 comprises a first body 1, a display unit D, a second body 2, a third body 3, a controlling unit 4, a shaft 6 (referring to FIG. 2B) and a flexible device 7 (referring to FIG. 2B). The first body 1 comprises a first half shell 11 and a second half shell 12 assembled to the first half shell 11. The second body 2, the third body 3, the controlling unit 4, the shaft 6 and the flexible device 7 are partially received in an accommodating space formed between the first and second half shells 11 and 12 of the first body 1, wherein the third body 3 is outwardly exposed by an outer surface 110/2 of the first half shell 11 of the first body 1. The display unit D is coupled to the controlling unit 4, and the second body 2 is selectively coupled to the controlling unit 4.

The first body 1, the second body 2, the third body 3, the controlling unit 4, the shaft 6 and the flexible device 7 form an assembly structure W1 (referring to FIG. 2B). The second body 2 is a movable element detachably disposed on the first body 1. The third body 3 is a switchable device disposed on the bottom of the first body 1, thereby inserting and positioning the second body 2 to the first body 1 along an inserting direction n1, or separating the second body 2 from the first body 1 along a separating direction n2. In this embodiment, the electronic device E-1 is a computer (e.g., a laptop), the first body 1 is a host, the display unit D is an LCD display pivoted to the first body 1 and coupled to the controlling unit 4, the second body 2 is an optical disk drive (ODD), and the controlling unit 4 is a circuit board disposed in the first body 1.

Hereinafter the computer E-1 represents the electronic device E-1, the host 1 represents the first body 1, the movable element 2 represents the second body 2, and the switchable device 3 represents the third body 3. It is to be understood that the second body 2 is not limited to the disclosed optical disk drive (ODD), but, the second body 2 can be a detachable accessory such as a floppy, a hard drive or a card reader, capable of assembling to or dissembling from the host 1 according to the principle of the embodiments.

FIG. 2A is a schematic view of a partial structure of the computer E-1 in FIG. 1B. In FIG. 2A, the controlling unit 4, the display unit D, the second half shell 12 of the host 1 and other related devices or elements of the computer E-1 are not shown for simplification, i.e., only the structure of the first half shell 11 of the host 1, the movable element 2 and the switchable device 3 are presented in FIG. 2A. FIG. 2B is a partially exploded view of the structure in FIG. 2A.

In FIGS. 2A and 2B, the first half shell 11 of the host 1 comprises a pivoting portion 101h, a first surface (inner surface) 110/1, a second surface (outer surface) 110/2, a first guiding portion 10G, two guiding rails 121, and two blocking plates 122. The first and second surfaces 110/1 and 110/2 are inner and outer surfaces of the first half shell 11, and the pivoting portion 101h is a shaft hole passing through the first and second surfaces 110/1 and 110/2 of the first half shell 11. A centerline L1-L1 is utilized to define the axial line of the pivoting portion 101h. The first guiding portion 10G comprises two spaced and curved recesses 10g1 and 10g2 which have different sizes and penetrate through the first and second surfaces 110/1 and 110/2 of the first half shell 11 with respect to the centerline L1-L1. The two guiding rails 121 are two spaced rectangular plates. In this embodiment, the curved recesses 10g1 and 10g2 of the first guiding portion 10G are two C-shaped recesses, and the curved recess 10g1 is dimensionally smaller than the curved recess 10g2.

Figure 3:
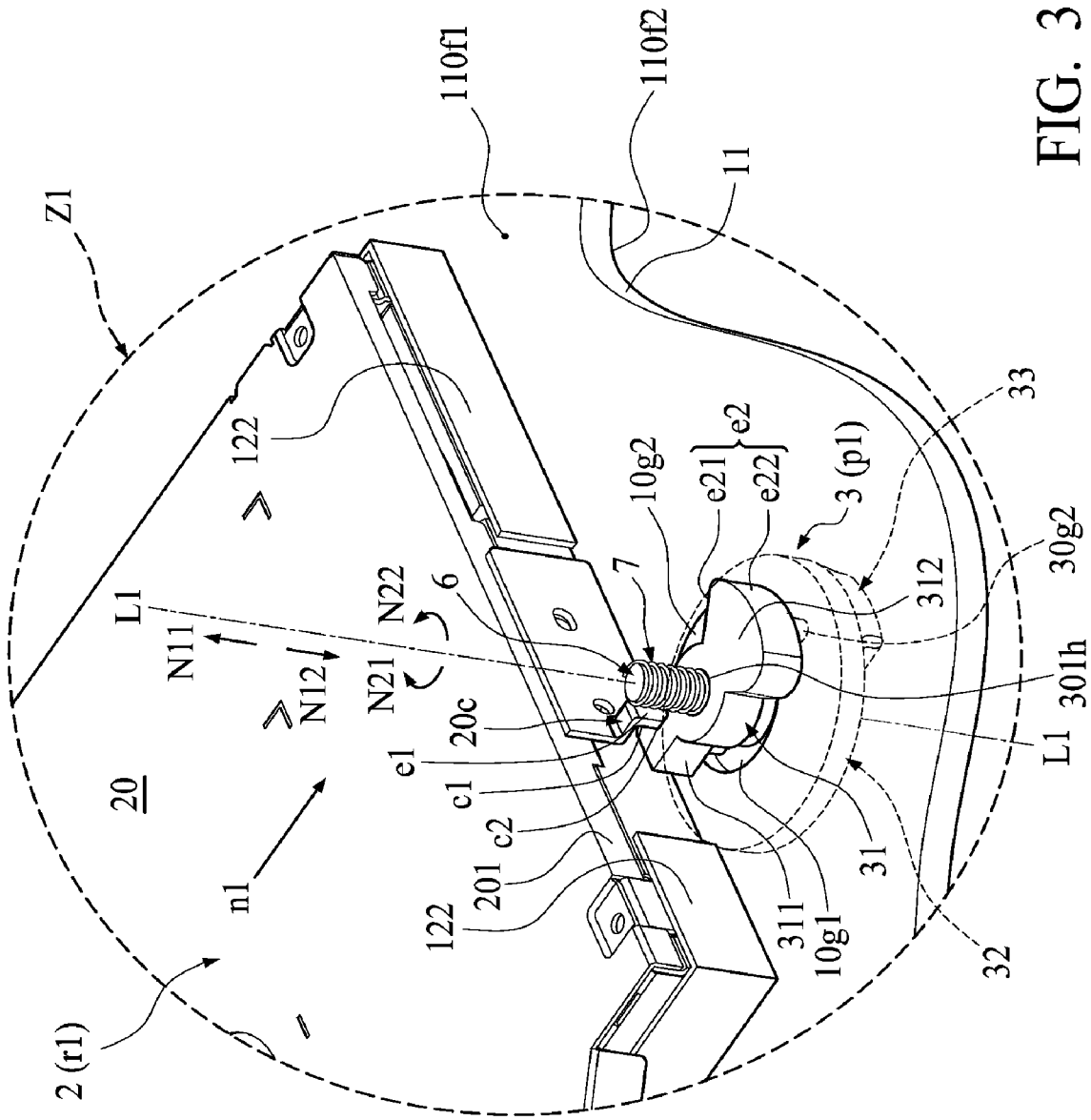
FIG. 3 is a partially enlarged view of the region (Z1) in FIG. 2A.
Figure 4:
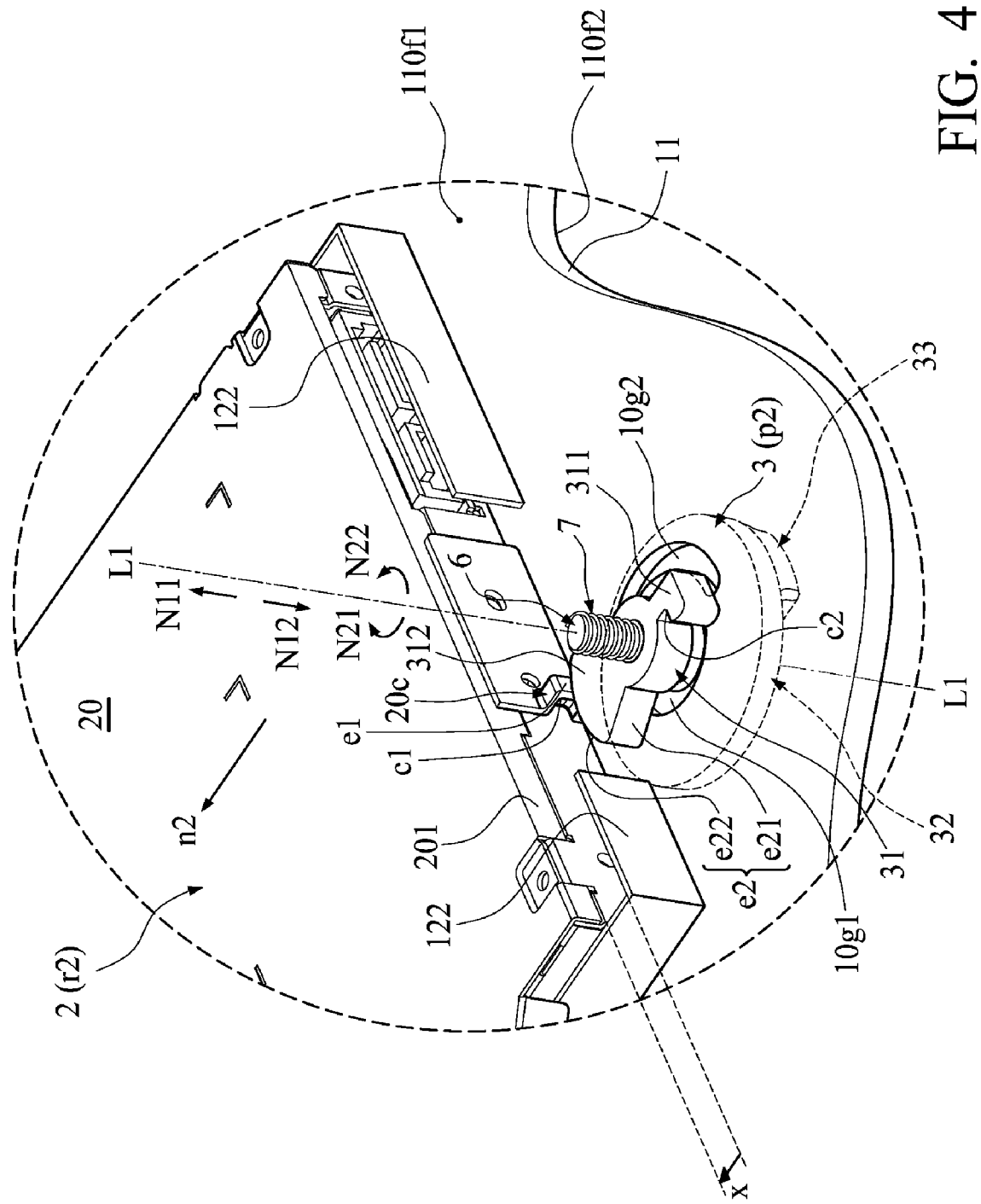
FIG. 4 is a view showing the structure of FIG. 3 in another state.

FIG. 3 is a partially enlarged view of the region Z1 in FIG. 2A, wherein the assembly structure W1 is in a closed state. FIG. 4 is a view showing the assembly structure W1 of FIG. 3 in a released state.

To clearly describe the relationship and movement of the components, the first half shell 11 of the host 1 and the curved recesses 10g1 and 10g2 of the first guiding portion 10G are partially crossed in FIGS. 3 and 4, and the profile of the switchable device 3 is presented by a dotted line.

In FIGS. 2A, 2B, 3 and 4, the movable element 2 is movably disposed between a first reference position r1 (i.e., the closed state shown in FIG. 3) and a second reference position r2 (i.e., the released state shown in FIG. 4) to detachably dispose on the host 1. The movable element 2 comprises a base seat 20 and an approximately C-shaped portion 20c. The base seat 20 is an approximately rectangular member provided with an acting end 201 and two side ends 203, and the approximately C-shaped portion 20c is disposed at the acting end 201 of the base seat 20. The approximately C-shaped portion 20c comprises a first positioning portion c1 and a first acting portion e1. With the guidance of the two guiding rails 121 of the host 1, the two side ends 203 of the base seat 20 of the movable element 2 is slidably moved along the two guiding rails 121 of the host 1 and stopped by the two blocking plates 122. In this embodiment, the approximately C-shaped portion 20c is formed by a bent plate and locked to the acting end 201 of the base seat 20 by fastening elements (e.g., screws), and the first positioning portion c1 and first acting portion e1 of the approximately C-shaped portion 20c are two surfaces located at different places but perpendicular to each other, i.e., the first positioning portion c1 is substantially perpendicular to the acting end 201 of the base seat 20 and the first acting portion e1 is substantially parallel to the acting end 201 of the base seat 20.

The switchable device 3 is a rotatable switchable device which is switched between a first predetermined position p1 (shown in FIG. 3) and a second predetermined position p2 (shown in FIG. 4) to couple between the host 1 and the movable element 2. The switchable device 3 comprises a first element 3-1 disposed between the first and second half shells 11 and 12 of the host 1 and a second element 3-2 outwardly exposed at the outer surface 110f2 of the first half shell 11 of the host 1 (see FIG. 1B).

In FIG. 2B, the first element 3-1 of the switchable device 3 comprises a cam body 31, a pivotal portion 301h, a second positioning portion c2 and a second acting portion e2. The cam body 31 has a first end 311 and a second end 312. The pivotal portion 301h is a shaft hole formed between the first and second ends 311 and 312 of the cam body 31, and the second positioning portion c2 is a recess formed at the first end 311 of the cam body 31, the second acting portion e2 is a curved surface formed at the second end 312 of the cam body 31 and comprises two surfaces e21 and e22 with different curvatures.

The second element 3-2 of the switchable device 3 comprises a disk-like body 32, a pivotal portion 302h, a second guiding portion 30G and a holding portion 33. The disk-like body 32 has a first surface 320f1 and a second surface 320f2. The second guiding portion 30G comprises two guiding blocks 30g1 and 30g2 corresponding to the two recesses 10g1 and 10g2 of the first guiding portion 10G and protrude from the first surface 320f1 of the disk-like body 32. The holding portion 33 is a rectangular protrusion protruded from the second surface 320f2 of the disk-like body 32.

In FIGS. 2B, 3 and 4, the shaft 6 and the flexible device 7 are commonly disposed between the first half shell 11 of the host 1 and the switchable device 3, thereby movably coupling the switchable device 3 to the first half shell 11 of the host 1.

In FIG. 2B, the shaft 6 passing through the pivoting portion 101h of the first half shell 11 of the host 1 is fitted to the pivotal portion 301h of the first element 3-1 and the pivotal portion 302h of the second element 3-2 of the switchable device 3 at two ends 61 and 62 thereof, respectively, so that the first and second elements 3-1 and 3-2 of the switchable device 3 are located at the first and second surfaces 110f1 and 110f2 of the first half shell 11 of the host 1, respectively. Further, the two guiding blocks 30g1 and 30g2 of the second guiding portion 30G of the second element 3-2 of the switchable device 3 are fitted movably in the two recesses 10g1 and 10g2 of the first guiding portion 10G of the first half shell 11 of the host 1, so that the two guiding blocks 30g1 and 30g2 of the second guiding portion 30G of the second element 3-2 of the switchable device 3 are limitedly guided by the two recesses 10g1 and 10g2 of the first guiding portion 10G of the first half shell 11 of the host 1.

In FIG. 2B, the flexible device 7 jacketed outside the shaft 6 comprises a first end 71 and a second end 72. The first and second ends 71 and 72 of the flexible device 7 are secured to the shaft 6 and the first half shell 11 of the host 1, respectively. A first reference direction N11 and a second reference direction N12 represent two opposite linear directions along the longitudinal direction of the centerline L1-L1, respectively. A first predetermined direction N21 and a second predetermined direction N22 represent two opposite rotational directions about the centerline L1-L1, respectively. Note that the first reference direction N11 is different from the first predetermined direction N21. In this embodiment, the flexible device 7 is a helix tension spring. With the limitation of the flexible device 7, the shaft 6 connected to the switchable device 3 is locally, reciprocally and linearly moved along the first reference direction N11, and the shaft 6 can also be locally and reciprocally rotated about the first predetermined direction N21.

In FIG. 3, when the movable element 2 is guided to the first reference position r1 by the two guiding rails 121 of the host 1 along the inserting direction n1, the user can rotate the holding portion 33 of the switchable device 3 along the first predetermined direction N21, where the holding portion 33 of the switchable device 3 is outwardly exposed by the second surface 110f2 of the first half shell 11 of the host 1 (shown in FIG. 1B), and the second positioning portion c2 of the first end 311 of the cam body 31 of the switchable device 3 is engaged with the first positioning portion c1 of the movable element 2, so that the movable element 2 can be accurately positioned at the first reference position r1 to couple or electrically connect to the controlling unit 4.

It is to be noted that the switchable device 3 rotated along the first predetermined direction N21 forcedly causes the deformation of the flexible device 7 through the shaft 6, an elastic force released from the deformed flexible device 7 pushes the switchable device 3 to move along the first reference direction N11, and the movable element 2 is locally and linearly moved along the first reference direction N11 driven by the moving switchable device 3, due to the mutual engagement of the second positioning portion c2 of the first end 311 of the cam body 31 of the switchable device 3 being engaged with the first positioning portion c1 of the movable element 2. In other words, because the second positioning portion c2 of the switchable device 3 is engaged with and abutted against (i.e., along the first reference direction N11) the first positioning portion c1 of the movable element 2, the movable element 2 is accurately positioned at the first reference position r1.

In FIG. 4, when the switchable device 3 is switched from the first predetermined position p1 toward the second predetermined position p2, the second positioning portion c2 of the switchable device 3 is detached from the first positioning portion c1 of the movable element 2, the movable element 2 is completely released from the first end 311 of the cam body 31 to linearly move to the initial position thereof along the second reference direction N12, and the two surfaces e21 and e22 of the second acting portion e2 of the switchable device 3 sequentially press on the first acting portion e1 of the movable element 2 to move along the second predetermined direction N22. When the cam body 31 of the switchable device 3 is in operation, the stroke of the cam body 31 of the switchable device 3 pushes the movable element 2 to move along the separating direction n2 from the first reference position r1 (closed state shown in FIG. 3) to the second reference position r2, i.e., the movable element 2 is moved at a distance x measured from the two blocking plates 122 of the host 1 to the acting end 201 of the movable element 2. Thus, the movable element 2 is completely separated from the switchable device 3 to disconnect the coupling or electrical connection of the movable element 2 and the controlling unit 4.

Figure 5A:
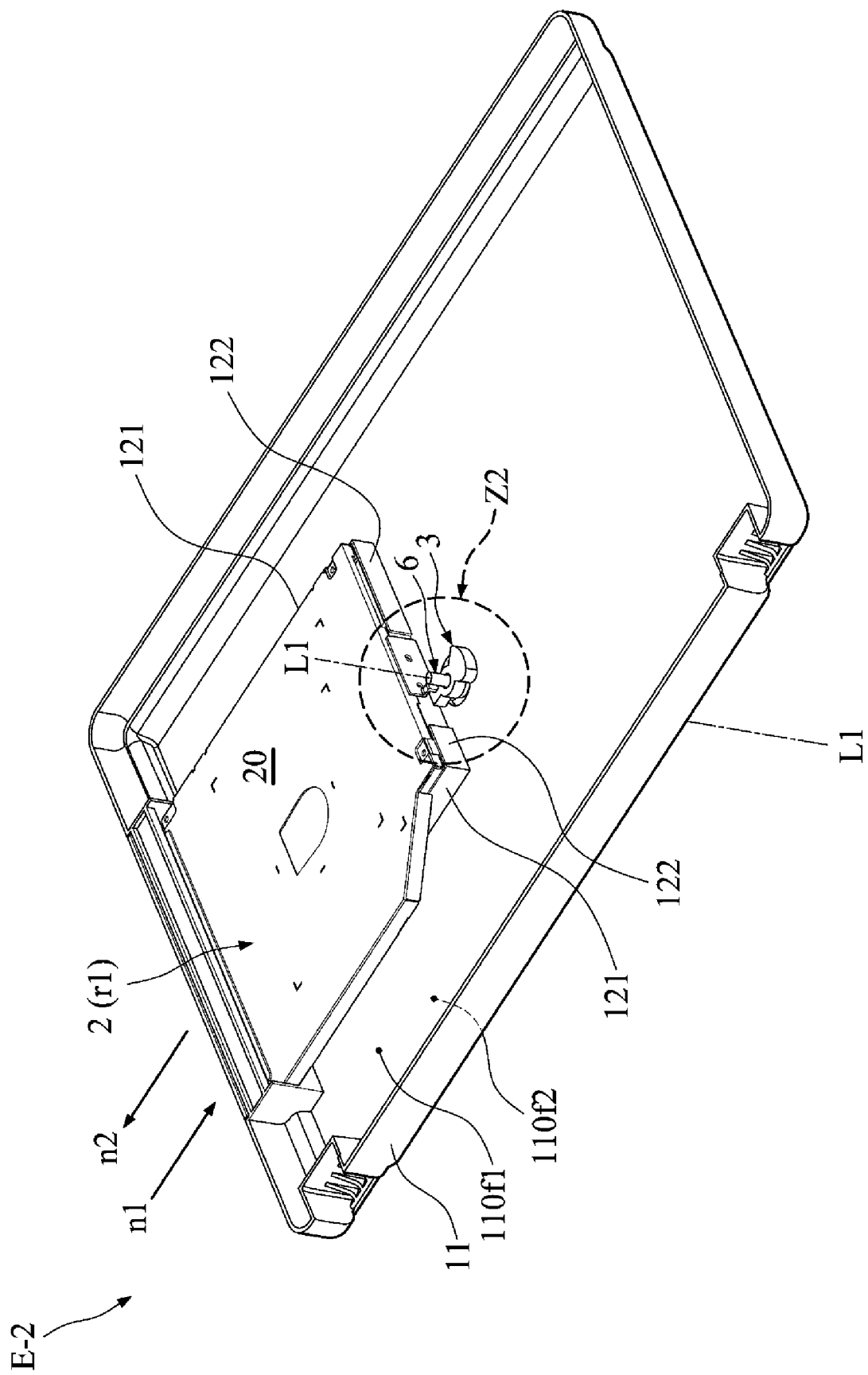
FIG. 5A is a schematic view of an electronic device of a second embodiment of the invention.
Figure 5B:
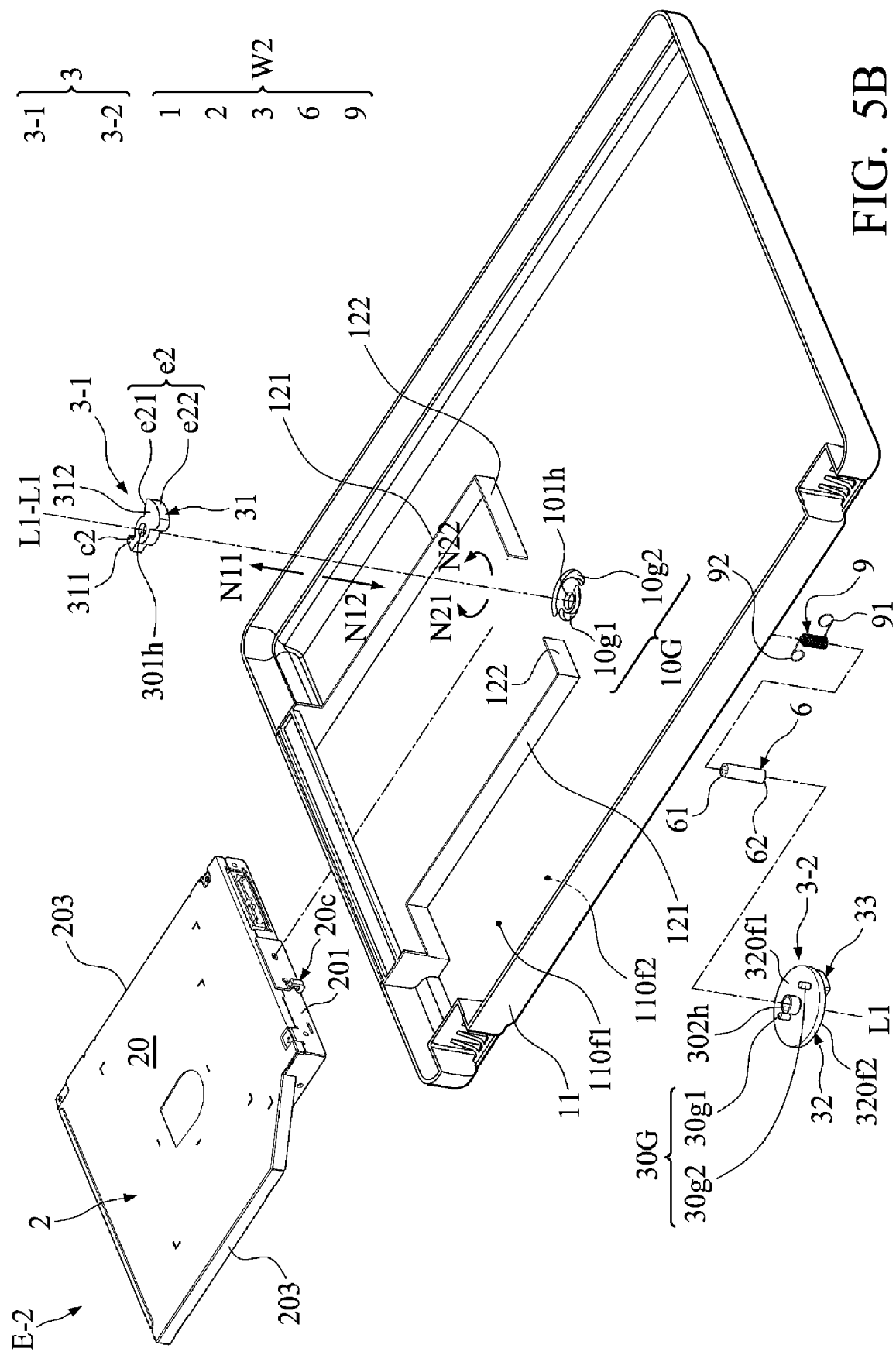
FIG. 5B is a partially exploded view of the electronic device in FIG. 5A.
Figure 6:
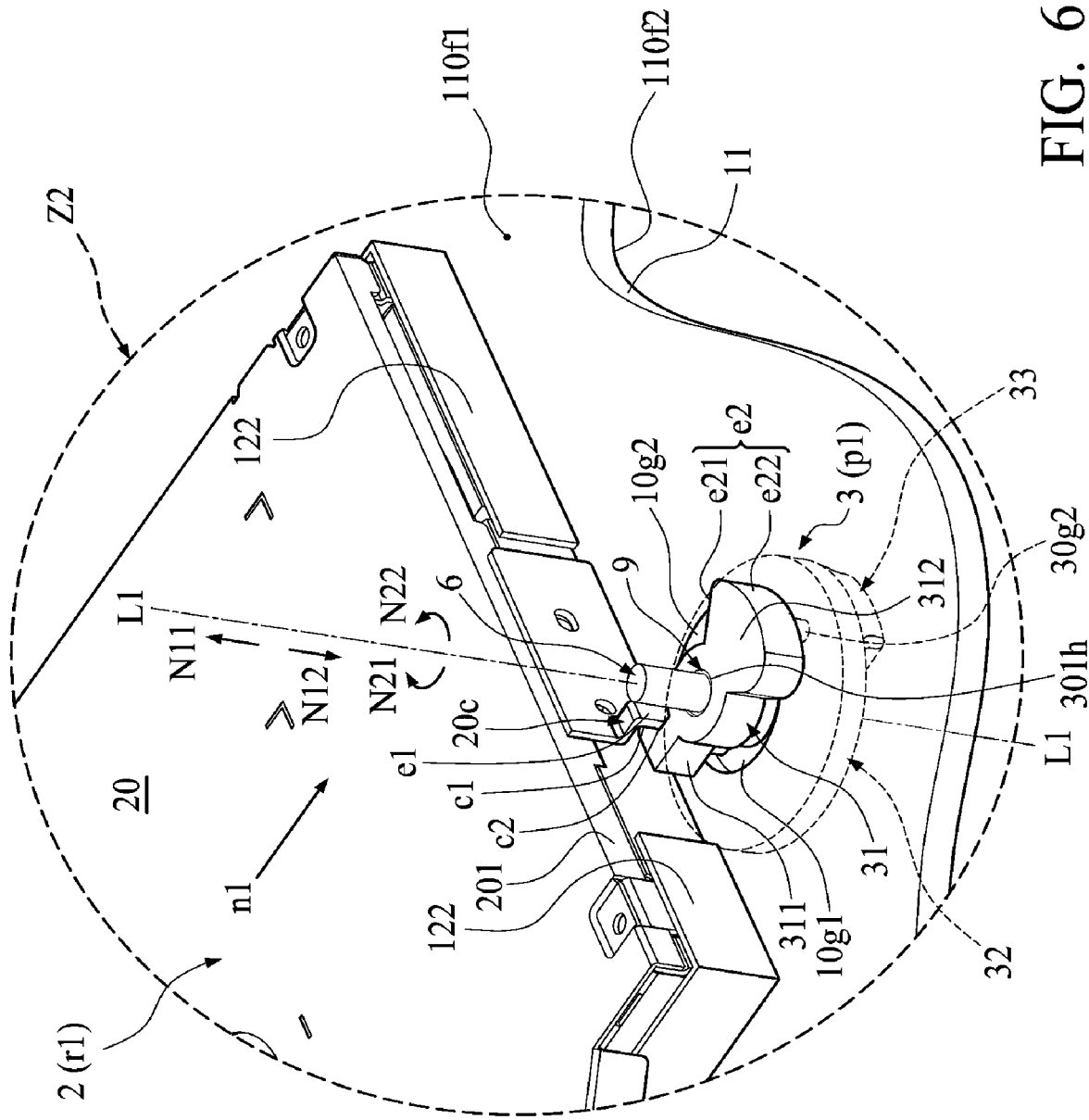
FIG. 6 is a partially enlarged view of an assembly structure in the region (Z2) in FIG. 5A.

FIG. 5A is a schematic view of an electronic device E-2 of a second embodiment, FIG. 5B is a partially exploded view of the electronic device E-2 in FIG. 5A, and FIG. 6 is a partially enlarged view of an assembly structure in the region Z2 in FIG. 5A.

The electronic device E-2 of the second embodiment differs from the electronic device E-1 of the first embodiment in that another flexible device 9 is provided, and the host 1, the movable element 2, the switchable device 3, the shaft 6 and the flexible device 9 form another assembly structure W2 (shown in FIG. 5B). A first end 91 and a second end 92 of the flexible device 9 are secured to the first half shell 11 of the host 1 and the shaft 6, respectively. In this embodiment, the flexible device 9 is a torsion spring. Note that the effect of the flexible device 9 of the electronic device E-2 is the same as the flexible device 7 of the electronic device E-1. In this embodiment, descriptions for the components and connected relationships thereof, that are similar to the first embodiment are omitted.

With the structural features of the electronic devices E-1 and E-2 of the embodiments, a user can rotatably operate the holding portion 33 of the switchable device 3 which is outwardly exposed by the host 1, thereby positioning the movable element 2 at the host 1 or releasing the movable element 2 from the host 1.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An assembly structure, comprising:
a first body comprising a first guiding portion;
a second body comprising a first positioning portion and a first acting portion, detachably disposed on the first body in a manner such that the second body is movable between a first reference position and a second reference position; and
a third body comprising a second positioning portion, a second guiding portion guided by the first guiding portion of the first body, and a second acting portion, switched between a first predetermined position and a second predetermined position to couple between the first body and the second body, wherein,
when the third body is switched to the first predetermined position, the second positioning portion of the third body engaged with the first positioning portion of the second body is pressed against the first positioning portion of the second body along a reference direction, so that the second body is positioned at the first reference position, and
when the third body is switched from the first predetermined position to the second predetermined position, the second acting portion of the third body is pressed against the first acting portion of the second body along a predetermined direction different from the reference direction, so that the second body is moved from the first reference position to the second reference position.

2. The assembly structure as claimed in claim 1, wherein the first guiding portion of the first body comprises two recesses and the second guiding portion of the third body comprises two guiding blocks fitted movably in the two recesses.

3. The assembly structure as claimed in claim 1, wherein the second body further comprises an approximately C-shaped portion, and the first positioning portion and the first acting portion are two surfaces located at different places.

4. The assembly structure as claimed in claim 1, wherein the third body further comprises a first end, and the second positioning portion is a recess formed at the first end.

5. The assembly structure as claimed in claim 4, wherein the third body further comprises a second end, and the second acting portion is a curved surface formed at the second end.

6. The assembly structure as claimed in claim 5, wherein the curved surface comprises at least two surfaces with different curvatures.

7. The assembly structure as claimed in claim 1 further comprising a flexible device disposed between the third body and the first body, wherein when the third body is switched to the first predetermined position, the second positioning portion of the third body is engaged to the first positioning portion of the second body and pressed against the first positioning portion of the second body via the flexible device along the reference direction.

8. The assembly structure as claimed in claim 7, wherein the flexible device comprises a helix tension spring or a torsion spring.

9. The assembly structure as claimed in claim 1 further comprising a shaft, wherein the third body is coupled to the first body via the shaft, the reference direction is a longitudinal direction of the shaft, and the predetermined direction is a rotating direction of the shaft.

10. An electronic device, comprising:
a host, comprising a first guiding portion;
a controlling unit;
a movable element comprising a first positioning portion and a first acting portion, detachably disposed on the host in a manner such that the movable element is selectively coupled to the controlling unit and movably disposed between a first reference position and a second reference position; and
a switchable device comprising a second positioning portion, a second guiding portion guided by the first guiding portion of the first body, and a second acting portion, switched between a first predetermined position and a second predetermined position to couple between the host and the movable element, wherein,
when the switchable device is switched to the first predetermined position, the second positioning portion of the switchable device engaged with the first positioning portion of the movable element is pressed against the first positioning portion of the movable element along a reference direction, so that the movable element is positioned at the first reference position and the movable element is coupled to the controlling unit, and
when the switchable device is switched from the first predetermined position to the second predetermined position, the second acting portion of the switchable device is pressed against the first acting portion of the movable element along a predetermined direction different from the reference direction, so that the movable element is moved from the first reference position to the second reference position and the coupling of the movable element and the controlling unit is disconnected.

11. The electronic device as claimed in claim 10, wherein the first guiding portion of the host comprises two recesses and the second guiding portion of the switchable device comprises two guiding blocks fitted movably in the two recesses of the first guiding portion.

12. The electronic device as claimed in claim 10, wherein the movable element further comprises an approximately C-shaped portion, and the first positioning portion and the first acting portion are two surfaces located at different places.

13. The electronic device as claimed in claim 10, wherein the switchable device further comprises a first end, and the second positioning portion is a recess formed at the first end.

14. The electronic device as claimed in claim 13, wherein the switchable device further comprises a second end, and the second acting portion is a curved surface formed at the second end.

15. The electronic device as claimed in claim 14, wherein the curved surface comprises at least two surfaces with different curvatures.

16. The electronic device as claimed in claim 10 further comprising a flexible device disposed between the switchable device and the host, wherein when the switchable device is switched to the first predetermined position, the second positioning portion of the switchable device is engaged to the first positioning portion of the movable element and pressed against the first positioning portion of the movable element via the flexible device along the reference direction.

17. The electronic device as claimed in claim 16, wherein the flexible device comprises a helix tension spring or a torsion spring.

18. The electronic device as claimed in claim 10 further comprising a shaft, wherein the switchable device is coupled to the host via the shaft, the reference direction is a longitudinal direction of the shaft, and the predetermined direction is a rotating direction of the shaft.

* * * * *